(12) United States Patent
Shin et al.

(10) Patent No.: US 7,713,329 B2
(45) Date of Patent: May 11, 2010

(54) APPARATUS FOR MANUFACTURING MOLTEN IRONS TO IMPROVE OPERATION OF FLUIDIZED BED TYPE REDUCTION APPARATUS AND MANUFACTURING METHOD USING THE SAME

(75) Inventors: Myoung-Kyun Shin, Pohang (KR); Jun-Hyuk Lee, Pohang (KR)

(73) Assignees: POSCO, Pohang-shi (KR); Research Institute of Industrial Science & Technology, Pohang (KR); Voest-Alpine Industrieanlagenbau GmbH & Co., Linz (AT)

( * ) Notice: Subject to any disclaimer, the term of this patent is extended or adjusted under 35 U.S.C. 154(b) by 683 days.

(21) Appl. No.: 10/540,496

(22) PCT Filed: Dec. 23, 2003

(86) PCT No.: PCT/KR03/02815

§ 371 (c)(1),
(2), (4) Date: Jun. 23, 2005

(87) PCT Pub. No.: WO2004/057038

PCT Pub. Date: Jul. 8, 2004

(65) Prior Publication Data

US 2006/0119023 A1      Jun. 8, 2006

(30) Foreign Application Priority Data

Dec. 23, 2002   (KR) .................. 10-2002-0082634

(51) Int. Cl.
  *C21B 13/02*   (2006.01)
  *C21B 13/14*   (2006.01)
(52) U.S. Cl. .............. 75/445; 75/448; 75/450
(58) Field of Classification Search ........... 75/446, 75/447, 450, 453, 494, 452, 455
  See application file for complete search history.

(56) References Cited

U.S. PATENT DOCUMENTS 3,305,312  A    2/1967   Weinstein et al. ............. 23/199

(Continued)

FOREIGN PATENT DOCUMENTS

CA        2 301 689        2/1999

(Continued)

OTHER PUBLICATIONS

Machine Translation of JP 07-188721 A from http://www.ipdl.inpit.go.jp/homepg_e.ipdl, published Jul. 25, 1995.*

(Continued)

*Primary Examiner*—George Wyszomierski
*Assistant Examiner*—Tima M McGuthry-Banks
(74) *Attorney, Agent, or Firm*—Marshall, Gerstein & Borun LLP (57) ABSTRACT

The invention relates to an apparatus and method for manufacturing molten iron. The method for manufacturing molten iron includes producing a mixture containing iron by drying and mixing iron-containing ore and additives, passing the mixture containing iron through one or more successively-connected fluidized beds so that the mixture is reduced and calcined to thereby perform conversion into a reduced material, forming a coal packed bed, which is a heat source in which the reduced material has been melted, charging the reduced material to the coal packed bed and supplying oxygen to the coal-packed bed to manufacture iron, and supplying reduced gas exhausted from the coal-packed bed to the fluidized bed, wherein in the conversion of the mixture to a reduced material, oxygen is directly supplied and combusted in an area where reduced gas flows to the fluidized bed. The apparatus for manufacturing molten iron of the invention uses this method for manufacturing molten iron. Through use of the invention, the reduced gas passing through the fluidized beds may be improved, and cohesion of the iron-containing fine ores may be prevented.

5 Claims, 5 Drawing Sheets

U.S. PATENT DOCUMENTS

| | | | | |
|---|---|---|---|---|
| 4,897,179 | A | * | 1/1990 | Mori et al. .................. 208/127 |
| 5,185,032 | A | | 2/1993 | Whipp ........................ 75/436 |
| 5,266,277 | A | * | 11/1993 | Katayama et al. ........... 422/143 |
| 5,535,991 | A | | 7/1996 | Kepplinger et al. ......... 266/160 |
| 5,584,910 | A | | 12/1996 | Kepplinger et al. ........... 74/445 |
| 6,277,324 | B1 | * | 8/2001 | Joo et al. .................... 266/142 |
| 6,350,288 | B1 | * | 2/2002 | Hirayama et al. ......... 48/197 R |
| 6,379,420 | B1 | * | 4/2002 | Kepplinger et al. ........... 75/414 |
| 6,418,866 | B1 | * | 7/2002 | Shimizu et al. ............. 110/347 |
| 2003/0159541 | A1 | * | 8/2003 | Kepplinger et al. ........... 75/450 |

FOREIGN PATENT DOCUMENTS

| | | |
|---|---|---|
| CA | 2 465 990 | 4/2004 |
| CN | 1247297 | 3/2000 |
| CN | 2433260 | 6/2001 |
| CN | 1319143 | 10/2001 |
| JP | 06-340909 | 12/1984 |
| JP | 62-228882 | 10/1987 |
| JP | 07-188721 | 7/1995 |
| JP | 11-131118 | 5/1999 |
| WO | WO 00/34531 | 6/2000 |
| WO | WO 02/00945 | 1/2002 |

OTHER PUBLICATIONS

Office action in corresponding Chinese Patent Application No. 200380107446.4, received Nov. 24, 2006.

Supplementary Search Report in corresponding European Application No. 03778993.0 dated Aug. 18, 2006.

Canadian Office Action for Application No. 2,511,731, dated Jun. 28, 2007.

European Office Action for Application No. 03 778 993.0-2122, dated Jun. 13, 2007.

International Search Report in PCT/KR2003/002815 dated Mar. 26, 2004.

International Preliminary Examination Report in PCT/KR2003/002815 dated Mar. 31, 2005.

* cited by examiner

APPARATUS FOR MANUFACTURING MOLTEN IRONS TO IMPROVE OPERATION OF FLUIDIZED BED TYPE REDUCTION APPARATUS AND MANUFACTURING METHOD USING THE SAME

BACKGROUND OF THE INVENTION (a) Field of the Invention

The invention relates to an apparatus and method for manufacturing molten irons, and more particularly to an apparatus and method for manufacturing molten irons that supplies oxygen and water to a fluidized-bed reactor for increasing a temperature in the fluidized-bed reactor to thereby manufacture molten irons.

(b) Description of the Related Art

The iron and steel industry is a core industry that supplies the basic materials needed in construction and in the manufacture of automobiles, ships, home appliances, and many of the other products we use. It is also an industry with one of the longest histories that has advanced together with human progress. In an iron foundry, which plays a pivotal roll in the iron and steel industry, after molten iron (i.e., pig iron in a molten state) is produced using iron ore and coal as raw materials, steel is produced from the molten iron and is then supplied to customers.

Approximately 60% of the world's iron production is realized using the blast furnace method developed in the 14th century. In the blast furnace method, cokes produced using iron ore and bituminous coal that have undergone a sintering process as raw materials are placed in a blast furnace, and oxygen is supplied to the furnace to reduce the iron ore to iron to thereby manufacture molten iron. The blast furnace method, which is a main aspect of molten iron production, requires raw materials having a hardness of at least a predetermined level and grain size that can ensure ventilation in the furnace. Coke in which specific raw coal that has undergone processing is needed as a carbon source to be used as fuel and a reducing agent. Also, sintered ore that has undergone a successive compacting process is needed as an iron source. Accordingly, in the modern blast furnace method, it is necessary to include raw material preparation and processing equipment such as coke manufacturing equipment and sintering equipment. Therefore, not only is it necessary to obtain accessory equipments in addition to the blast furnace, but equipment to prevent and minimize the generation of pollution in the accessory equipment is needed. The amount of investment, therefore, is considerable, ultimately increases manufacturing costs.

In order to solve these problems of the blast furnace method, significant effort is being put forth in iron foundries all over the world to develop a smelting reduction process that produces molten irons by directly using fine coal as fuel and as a reducing agent, and also directly using fine ores, which are used in over 80% of the world's ore production, as an iron source.

As an example of such a smelting reduction process, U.S. Pat. No. 5,584,910 discloses a method of manufacturing molten iron that directly uses fine coals and fine ores. A method is disclosed in this patent for producing a molten pig iron or molten steel preliminary product from a charge material that partially includes fine iron ores. The fine iron ores are directly reduced into sponge irons in at least one fluidized-bed reactor, and the sponge iron is melted in a melting region by supplying carbon carriers and an oxygen containing gas. Reduced gas that is generated in this process is provided to the fluidized-bed reactors, then is exhausted as an exhaust gas after undergoing reaction.

When compared to the conventional blast furnace method, since the above method for manufacturing molten iron uses fine iron ores and fine coals instead of lump ores and cokes, the advantage is realized in which the range of grain sizes of raw coal is wide. Further, equipment stoppages and re-starting are easy. However, as a result of using the fine iron ores as raw material and also using multiple stages of fluidized-bed reactors, it is not easy to adjust an inner state of the fluidized-bed reactors, and in particular, an inner temperature thereof.

Accordingly, in order to adjust an inner temperature of the fluidized-bed reactors, a method is used in which a separate combustion chamber and burner are provided to an exterior of the fluidized-bed reactors to thereby increase the temperature of a gas supplied to the fluidized-bed reactors. However, when the reaction gas that is increased in temperature passes through a dispersing plate provided to induce uniform gas flow in the fluidized-bed reactors, ore particles contained in the reaction gas form a compound having a low melting point such that the dispersing plate becomes blocked, thereby making it impossible to perform fluidized bed reduction process.

SUMMARY OF THE INVENTION

The invention has been made in an effort to solve the above problems. The present invention provides an apparatus and method for manufacturing molten iron that supplies oxygen and water directly to a fluidized-bed reactor to increase a temperature of a reaction gas and prevent molten fine ores from adhering to the fluidized-bed reactor thereby improving operation of the fluidized-bed reactor.

The method for manufacturing molten iron includes the steps of producing a mixture containing iron by drying and mixing iron ores and additives; passing the mixture containing iron through one or more successively-connected fluidized beds so that the mixture is reduced and calcined to thereby perform conversion into a reduced material; forming a coal packed bed, which is a heat source in which the reduced material has been melted; charging the reduced material to the coal packed bed and supplying oxygen to the coal packed bed to manufacture molten irons; and supplying reduced gas exhausted from the coal packed bed to the fluidized bed, wherein in the step of converting the mixture to the reduced material, oxygen is directly supplied and combusted in an area where reduced gas flows to the fluidized bed.

In the step of converting the mixture containing iron to a reduced material, water may be supplied separately from the oxygen supply combustion process and then be mixed with the oxygen.

Preferably, the water is one of process water and steam.

The water may be supplied at a rate of 300~500 $Nm^3/hr$.

Preferably, the oxygen is supplied and combusted in the case where an internal temperature of a fluidized-bed reactor is 650° C. or higher.

The step of converting the mixture containing iron to a reduced material includes (a) pre-heating the mixture containing iron in a first fluidized bed; (b) performing preliminary reduction of the pre-heated mixture containing iron in a second fluidized bed; and (c) performing final reduction of the mixture containing iron that has undergone preliminary reduction to thereby realize conversion into the reduced material. The oxygen is directly supplied and combusted in the step (a) and the step (b).

Oxygen may be supplied and combusted immediately prior to steps (a), (b), and (c).

The apparatus for manufacturing molten iron includes one or more fluidized-bed reactors that reduce and calcine iron ores and additives which are dried and mixed to convert into a reduced material; a melter-gasifier for charging the reduced material and receiving the supply of oxygen to manufacture molten irons; and a reduced gas supply line for supplying reducing gas exhausted from the melter-gasifier to the fluidized-bed reactors, wherein the fluidized-bed reactors each include a dispersing plate at a lower area thereof and through which the reduced gas passes, and an oxygen burner mounted to an outer wall of the fluidized-bed reactor at an area above the dispersing plate.

The oxygen burner includes a first member inside of which coolant circulates in a lengthwise direction; and a second member encompassed by the first member along a lengthwise direction in a state separated from the same, and inside of which coolant is circulated. Preferably, oxygen is supplied and combusted between the first member and the second member, and a distance between the first member and the second member is getting reduced as coming close to the inside of fluidized-bed reactor.

The fluidized-bed reactors may each include a water supply nozzle mounted to an outer wall of the fluidized-bed reactor at an area above the dispersing plate, and positioned at an area in the vicinity of the oxygen burner.

A direction that the water supply nozzle supplies water is preferably at an angle of 4~15° with respect to the lengthwise direction of the oxygen burner.

The water may be one of process water and steam.

The water may be atomized and supplied at a rate of 300~500 $Nm^3/hr$.

The fluidized-bed reactors may include a pre-heating furnace for pre-heating the mixture containing iron; a preliminary reduction furnace connected to the pre-heating furnace and performing preliminary reduction of the pre-heated mixture containing iron; and a final reduction furnace connected to the preliminary reduction furnace and performing final reduction of the mixture containing iron that has undergone preliminary reduction to thereby realize conversion into the reduced material, wherein an oxygen burner is included in each of the pre-heating furnace and the preliminary reduction furnace.

Each of fluidized-bed reactors may further include a water supply nozzle mounted to an outer wall of the fluidized-bed reactor at an area above the dispersing plate, and positioned in the vicinity of the oxygen burner.

DETAILED DESCRIPTION OF THE PREFERRED EMBODIMENTS

Preferred embodiments of the invention will now be described in detail with reference to the accompanying drawings. Many variations and/or modifications of the basic inventive concepts may appear to those skilled in the present art. The embodiments are to be regarded as illustrative in nature, and not restrictive.

Figure 1:
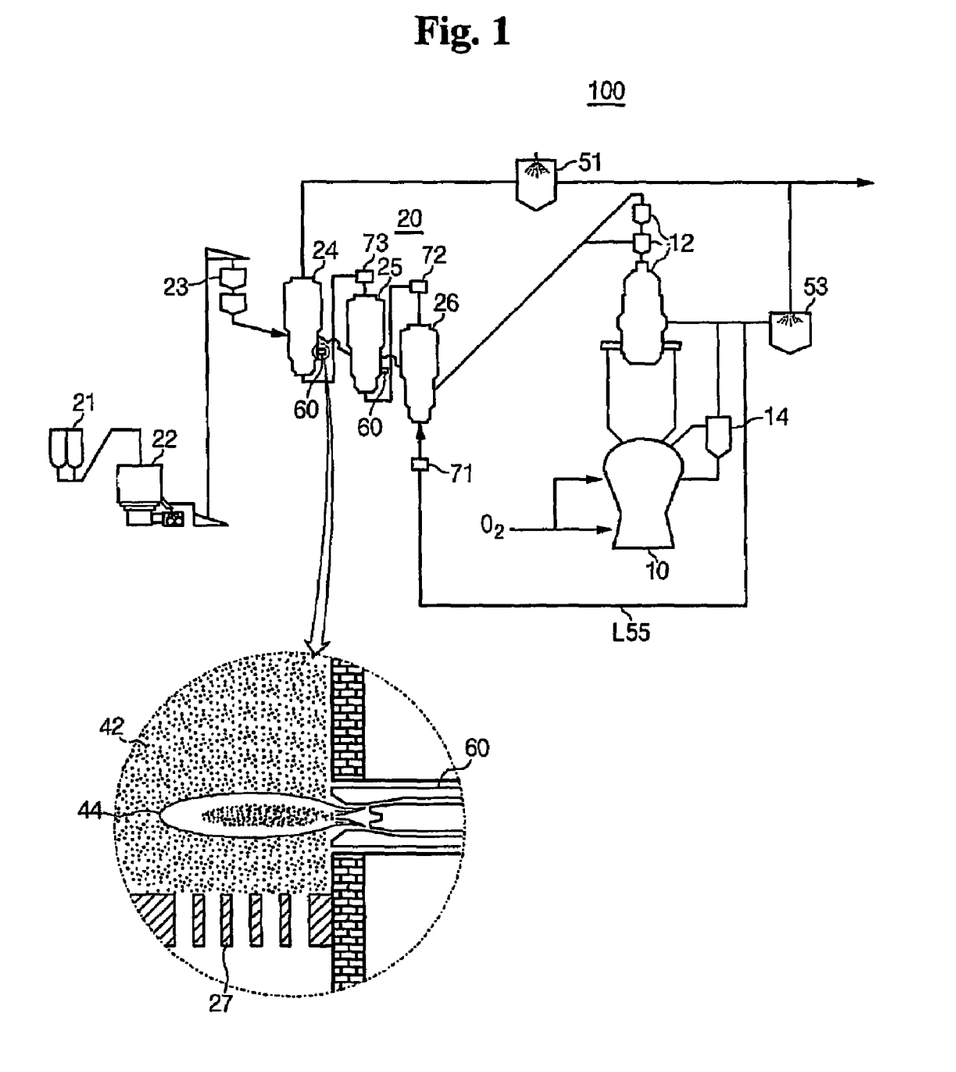
FIG. 1 is a schematic view of an apparatus for manufacturing molten iron according to a first embodiment of the invention.

FIG. 1 is a schematic view of an apparatus for manufacturing molten iron according to a first embodiment of the invention. The apparatus is shown in a state where oxygen burners are mounted to fluidized-bed reactors.

An apparatus 100 for manufacturing molten iron according to a first embodiment of the invention includes the main elements of a fluidized-bed reactor unit 20, a melter-gasifier 10, and other accessory equipments. The fluidized-bed reactor unit 20 includes one or more fluidized-bed reactors having a fluidized bed therein, and acts to reduce and calcine iron ores and additives to reduced material. The reduced material is charged to the melter-gasifier 10, which includes a coal packed bed therein, and oxygen is supplied to the melter-gasifier 10 to thereby produce molten irons. Reduced gas exhausted from the melter-gasifier 10 is used to reduce and calcine iron ores and additives by passing through the fluidized-bed reactors after being supplied to the same via a reduced gas supply line L55, after which the reduced gas is exhausted to the outside.

Elements included in the apparatus 100 for manufacturing molten iron according to the first embodiment of the invention will now be described in more detail.

After temporarily storing fine ores containing iron and additives of a grain size of 8 mm or less at room temperature, the fluidized-bed reactor unit 20 removes water from these elements in a drier 22 and mixes the same to produce a mixture that contains iron. The mixture containing iron manufactured in this manner is charged to the fluidized-bed reactors. An intermediate vessel 23 is provided between the drier 22 and the fluidized-bed reactors such that the iron containing mixture at room temperature is charged to the fluidized-bed reactors that are maintained at a pressure from a normal pressure to 1.5~3.0 atmospheres.

As shown in FIG. 1, the fluidized-bed reactors in the first embodiment of the present invention are realized through three stages. This number of the fluidized-bed reactors is for illustrative purposes only and is not meant to restrict the invention. Accordingly, a variety of different numbers of stages may be used for the fluidized-bed reactors.

The fine ores containing iron and additives supplied to the fluidized-bed reactors form a fluidized bed by contacting a high temperature reduced gas current, and is converted into a high temperature reduced material that is at a temperature of 80° C. or more, is 80% or more reduced, and is 30% or more calcined. As shown in FIG. 1, in a first stage of the fluidized bed reduction process, the iron containing mixture at room temperature is pre-heated in a pre-heating reactor 24. Next, in a second stage, preliminary reduction of the pre-heated mixture containing iron is performed in a preliminary reducing reactor 25, which is connected to the pre-heating reactor 24. Finally, in a third stage, the iron containing mixtures that are reduced in the preliminary reducing reactor 25 undergoes final reduction in a final reducing reactor 26, which is connected to the preliminary reducing reactor 25.

Although not shown in FIG. 1, to prevent scattering loss when reduced material exhausted from the fluidized-bed reactors is directly charged to the melter-gasifier 10, a hot compacting apparatus may be mounted between these elements. Further, a hot intermediate vessel 12 is provided for supplying the reduced material exhausted from the fluidized-bed reactors to the melter-gasifier 10 to thereby make supply of the reduced material to the melter-gasifier 10 easy.

Lump coal or shaped coal realized by compressing fine coal is supplied to the melter-gasifier 10 to form a coal packed bed. The lump coal or shaped coal supplied to the melter-gasifier 10 is gasified by a pyrolysis reaction at an upper area of the coal-packed bed and by a combustion reaction using oxygen at a lower area of the coal-packed bed. Hot reduced gas generated in the melter-gasifier 10 by the gasified reaction is supplied in succession to the fluidized-bed reactors through the reduced gas supply line L55, which is connected to a rear end of the final reducing reactor 26, to be used as a reducing agent and fluidized gas.

A dome-shaped empty space is formed to an area above a coal packed bed of the melter-gasifier 10. The flow rate of gas is reduced by the empty space such that large amounts of fine ores included in the charged reduced material and fine ores generated as a result of an abrupt increase in temperature of coal charged in the melter-gasifier 10 are prevented from being discharged out of the melter-gasifier 10. Further, such a configuration allows for absorbing of variations in pressure in the melter-gasifier 10 caused by irregular changes in the amount of gas generated as a result of directly using coal. The coal is gasified and removes volatile matters while dropping to the bottom of the coal packed bed, and ultimately is burned by oxygen supplied through tuyeres at the bottom of the melter-gasifier. The generated combustion gas raises through the coal packed bed, and is converted into high temperature reduced gas and exhausted to outside the melter-gasifier 10. Part of the combustion gas is scrubbed and cooled while passing through water collecting devices 51 and 53 such that pressure applied to the melter-gasifier 10 is maintained within the range of 3.0~3.5 atmospheres.

A cyclone 14 collects exhaust gas generated in the melter-gasifier 10 such that dust is again supplied to the melter-gasifier 10, and gas is supplied as reduced gas to the fluidized-bed reactors through the reduced gas supply line L55. Reduced iron drops within the coal packed bed together with the coal to undergo final reduction and smelting by combustion gas and combustion heat generated by gasifying and combusting coal, after which the iron is exhausted to the outside.

Since reduced gas exhausted from the melter-gasifier 10 slowly decreases in temperature while passing through the fluidized-bed reactors, additional oxygen supply apparatuses 71, 72, and 73 are provided in the system. Oxygen is supplied by the oxygen supply apparatuses 71, 72, and 73 to be partially combusted, and the reduced gas is increased in temperature using the combustion heat while maintaining a suitable level of oxidation of the reduced gas.

In the first embodiment of the invention, in order to prevent reduced gas raised in temperature from damaging or blocking a dispersing plate mounted to a lower area of the fluidized-bed reactors and through which reduced gas passes, to oxygen is directly supplied to and combusted in an area where reduced gas flows to fluidized beds of the fluidized-bed reactors. To realize this in the invention, as shown in the enlarged circle of FIG. 1, an oxygen burner 60 is mounted to an exterior wall of each of the fluidized-bed reactors at an area above a dispersing plate 27. Therefore, the reduced gas is minimally increased in temperature by the oxygen supplied through the oxygen supply apparatuses 71, 72, and 73. Also, it is possible to further increase the temperature of the reduced gas by operation of the oxygen burners 60.

In the case where oxygen is supplied and combusted through the oxygen burner 60 shown in the enlarged circle of FIG. 1, a combustion area 44 is formed in the vicinity of the oxygen burner 60. In the first embodiment of the invention, oxygen is directly supplied to and combusted in the area where reduced gas flows to the fluidized beds in the fluidized-bed reactors. Accordingly, with the formation of the combustion area 44 in the area where the fluidized beds are formed where the dispersing plate 27 is already passed, any negative affect given to the dispersing plate 27 is minimized.

In the first embodiment of the invention, one of the oxygen burners 60 is preferably mounted to the pre-heating reactor 24 and to the preliminary reducing reactor 25 for direct supply and combustion of oxygen. Since a reduction rate of the iron containing mixtures forming a fluidized layer is not very high in the pre-heating reactor 24 and the preliminary reducing reactor 25, even if contact is made with the oxygen flame, molten cohesion of the iron containing mixture is not very significant. In contrast to this, material forming the fluidized beds reaches a reduction rate of a predetermined level in the final reducing reactor 26 such that there is concern for molten cohesion of the fine direct reduced iron such that oxygen is preferably not directly supplied to the final reducing reactor 26.

In addition, in the case where an internal temperature of the pre-heating reactor 24, the preliminary reducing reactor 25, and the final reducing reactor 26 (i.e., in the fluidized-bed reactors) is 650° C. or greater, it is preferable that oxygen is supplied through the oxygen burners 60. If the oxygen burners 60 are operated to supply oxygen when the internal temperature of the fluidized-bed reactors is less than 650° C., part of the supplied oxygen is not burned and is instead mixed and flows with the reduced gas to reduce the reduction rate of the iron containing mixture. The oxygen burners 60 will be described in greater detail with reference to FIG. 2.

Figure 2:
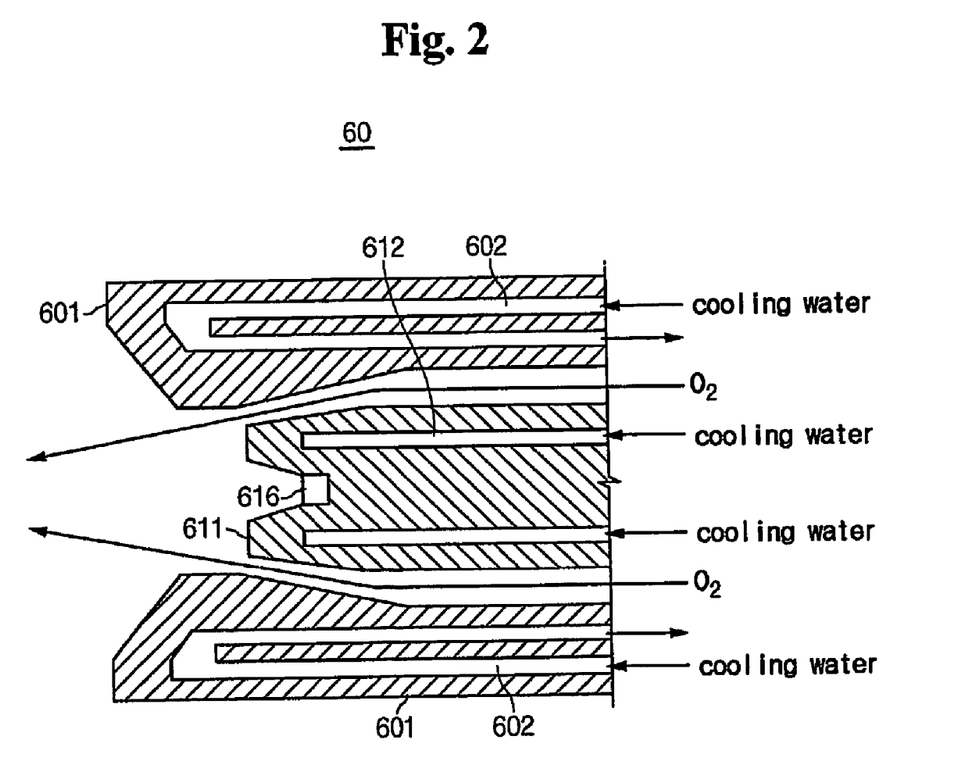
FIG. 2 is a partial sectional view of an oxygen burner according to a first embodiment of the invention.

FIG. 2 is a partial sectional view of one of the oxygen burners 60 according to the first embodiment of the invention. Since an exterior of the oxygen burner 60 is easily understood by those skilled in the art, only a sectional view of this element is shown.

As shown in FIG. 2, the oxygen burner 60 is formed in a double pipe structure. The oxygen burner 60 includes a first member 601 inside of which coolant circulates in a lengthwise direction, and a second member 611 encompassed by the first member 601 along a lengthwise direction in a state separated from the same, and inside of which coolant is circulated. The second member 611 includes a flame sensor 616 provided to one end. The oxygen burner 60 may include additional devices required for oxygen. Oxygen is supplied between the first member 601 and the second member 611, and, as shown in FIG. 2, a distance between the first member 601 and the second member 611 is getting reduced as coming close to the inside of fluidized-bed reactor (i.e., in the direction of the arrows) such that oxygen is combusted while being sprayed at a high pressure. Further, the oxygen is concentrated toward a center position for supply and combustion such that the oxygen is sprayed deep into the fluidized bed in the fluidized-bed reactor while a flame is effectively formed.

Cooling pipes 602 and 612 are formed respectively in the first member 601 and the second member 611 to protect the oxygen burner 60 from the high temperature oxygen flame. A coolant is supplied and circulated through the cooling pipes 602 and 612.

The flame sensor 616 mounted to one end of the second member 611 detects whether the oxygen supplied to within the fluidized bed has been combusted. The flame sensor 616 detects an oxygen flame within a matter of seconds during oxygen supply, and continuously maintains the oxygen flame. By the installed flame sensor 616, there is no concern of a decrease in the reducing rate of the reducing gas by oxygen not being combusted and mixed with the reducing gas, or of the oxygen that is not combusted converting in one area and exploding.

A second embodiment of the invention will be described below with reference to FIGS. 3 and 4.

Figure 3:
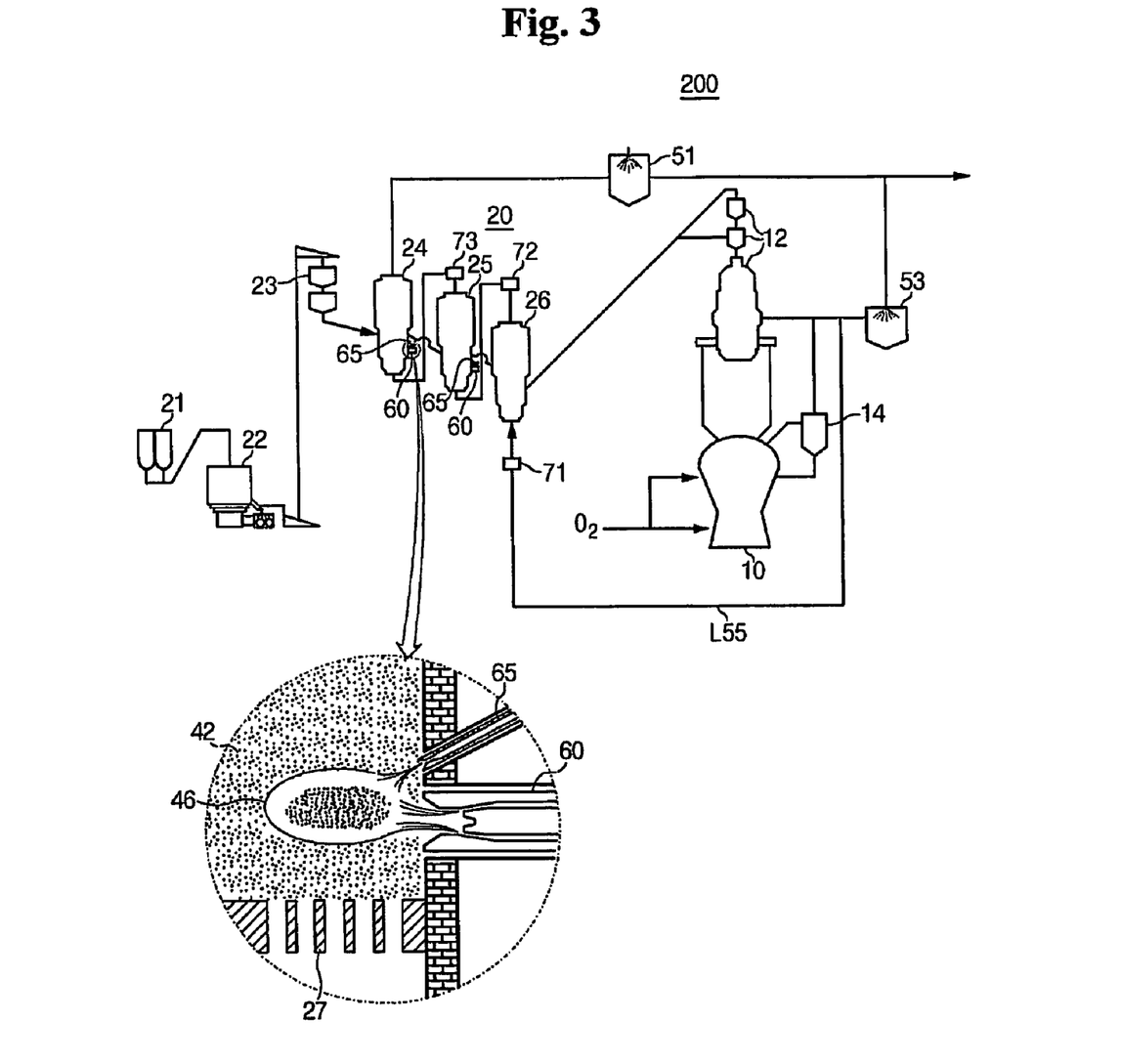
FIG. 3 is a schematic view of an apparatus for manufacturing molten iron according to a second embodiment of the present invention.

FIG. 3 is a schematic view of an apparatus for manufacturing molten iron according to a second embodiment of the invention. The apparatus is shown in a state where oxygen burners and water supply nozzles are mounted to fluidized-bed reactors.

An apparatus 200 for manufacturing molten iron according to a second embodiment of the invention is identical to the apparatus of the first embodiment except for the water supply nozzles. Therefore, an explanation of these identical elements will not be provided and the description will be concentrated on the water supply nozzles.

As shown in the enlarged circle of FIG. 3, the apparatus 200 for manufacturing molten iron according to the second embodiment of the invention includes a water supply nozzle 65 positioned in the vicinity of the oxygen burners 60 mounted to the outer wall above the dispersing plate 27 in each of the fluidized-bed reactors. The fluidized-bed reactors may include additional equipment as needed.

The water supply nozzle 65 mixes and supplies water to the oxygen flame supplied and formed through the oxygen burner 60 to thereby form a combustion area 46. Accordingly, a temperature of the oxygen flame may be reduced such that molten cohesion of reduced iron in a high temperature area by direct contact to the oxygen flame or by the oxygen flame is minimized. In addition, by the reduction in the temperature of the oxygen flame, damage to the material positioned opposite where the oxygen flame is formed is decreased.

Figure 4:
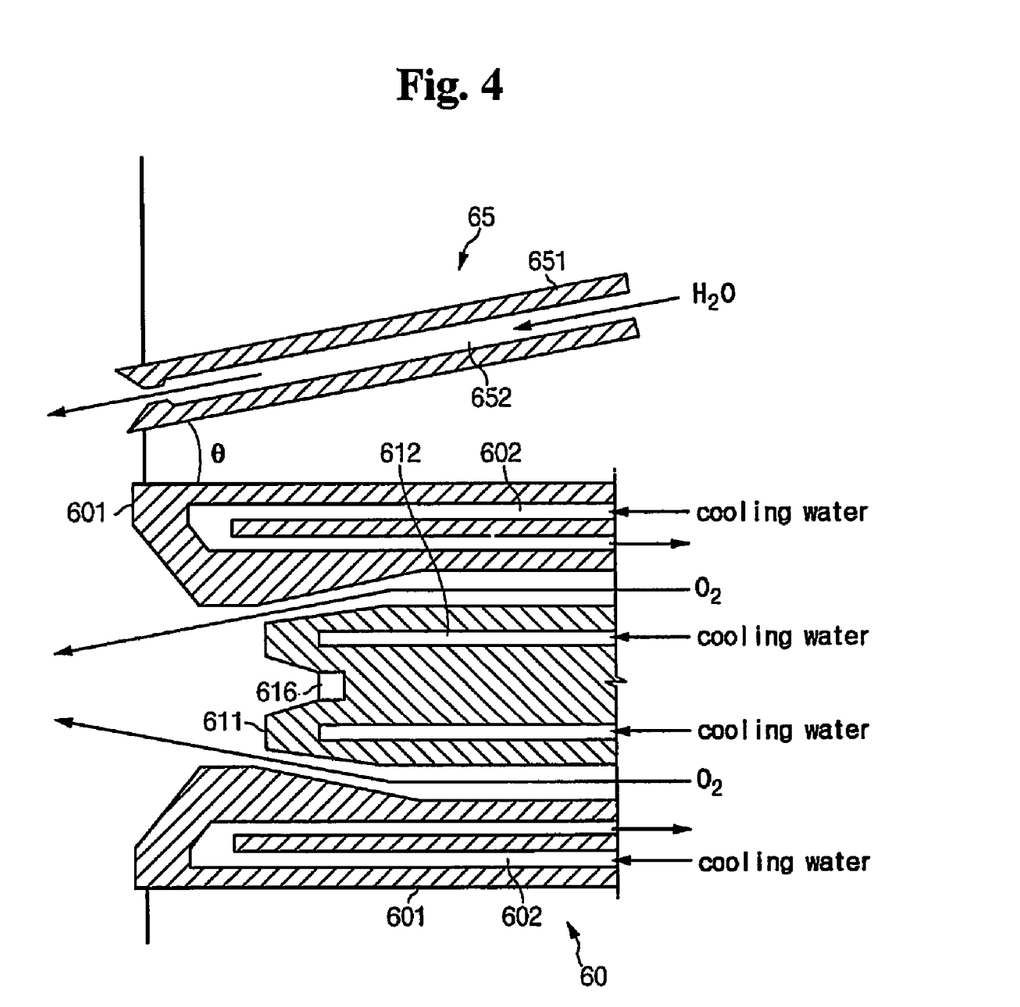
FIG. 4 is a partial sectional view of an oxygen burner and a water supply nozzle according to a second embodiment of the invention.

FIG. 4 is a partial sectional view of one of the oxygen burners and its corresponding water supply nozzle according to the second embodiment of the invention. Since the oxygen burner 60 is identical to that of the first embodiment of the invention, a detailed description thereof is omitted. The water supply nozzle 65 is structured including a pipe member 651 with an aperture 652 formed therein. Water is supplied through the aperture 652 separately from the oxygen and mixed into the oxygen flame.

In FIG. 4, although the water supply nozzle 65 is shown positioned directly over the oxygen burner 60, such a configuration is shown merely to illustrate the invention and is not meant to limit the same. Accordingly, it is only necessary that the water supply nozzle 65 be positioned in the vicinity of the oxygen burner 60.

At least one of process water and steam used in the process to manufacture molten iron may be individually or jointly mixed then used during oxygen supply and combustion. In this case, the temperature of the oxygen flame is not only reduced, but as a result of water shift reaction resulting from an oxygen flame of a maximum temperature, the supplied process water or steam is separated into its elements of oxygen and hydrogen. The oxygen is combusted in the oxygen flame, and the hydrogen is included in the reduced gas to aid in the reduction reaction of the iron containing mixture. In particular, hydrogen is mainly used as a reducing agent in methods to manufacture molten iron, and is a powerful reducing agent that has approximately four times the reducing strength of carbon monoxide. Therefore, water supply is highly preferable.

Water atomized and supplied through the water supply nozzle 65 is preferably supplied at a rate of 300~500 Nm$^3$/hr. If water is not atomized and supplied, and instead directly supplied, a water shift reaction or a cooling effect of combustion gas is unable to be obtained.

If the supply rate of water is less than 300 Nm$^3$/hr, the oxygen flame temperature is unable to be reduced. Further, the amount of resolved oxygen and hydrogen is small such that the water supply effect is minimal and the oxygen supply flow rate of the oxygen burner 60 is low, thereby possibly causing malfunction of the oxygen burner 60. If the amount of water supplied exceeds 500 Nm$^3$/hr, an amount of water of more than needed contacts the oxygen flame to reduce the heating effect of the fluidized beds by the oxygen flame by half. In addition, water that does not participate in the water shift reaction and is left remaining in a steam state acts as a binder to thereby possibly cause cohesion of the iron containing mixture.

In the second embodiment of the invention, the water supply nozzle 65 is mounted such that a direction along which it supplies water is set at an angle ($\theta$) of 4~15° with respect to a lengthwise direction of the oxygen burner 60. As shown in FIG. 4, in the case where the water supply nozzle 65 is provided above the oxygen burner 60, it is preferable that the water supply nozzle 65 is slanted downwardly 4~15°. If the angle ($\theta$) is less than 4°, the point at which contact is made to the oxygen flame is further extended into the fluidized bed or does not contact the oxygen flame at all. If the angle ($\theta$) exceeds 15°, not only is the supply path of the oxygen flame obstructed, but the amount of time to reach the oxygen flame is too short such that a reduction in temperature of the oxygen flame and the water shift reaction cannot be expected.

The invention will be described in greater detail below through an experimental example. This experimental example merely illustrates the invention and is not meant to limit the invention.

EXPERIMENTAL EXAMPLE

At the same time oxygen is supplied through the oxygen burner, water is supplied through the water supply nozzle to adjust the water supply amount according to the second embodiment of the invention. A simulating experiment was performed to measure the resulting oxygen flame temperature. The water supply amount is measured using a flow meter, and the oxygen flame temperature is measured using a UV thermometer.

Figure 5:
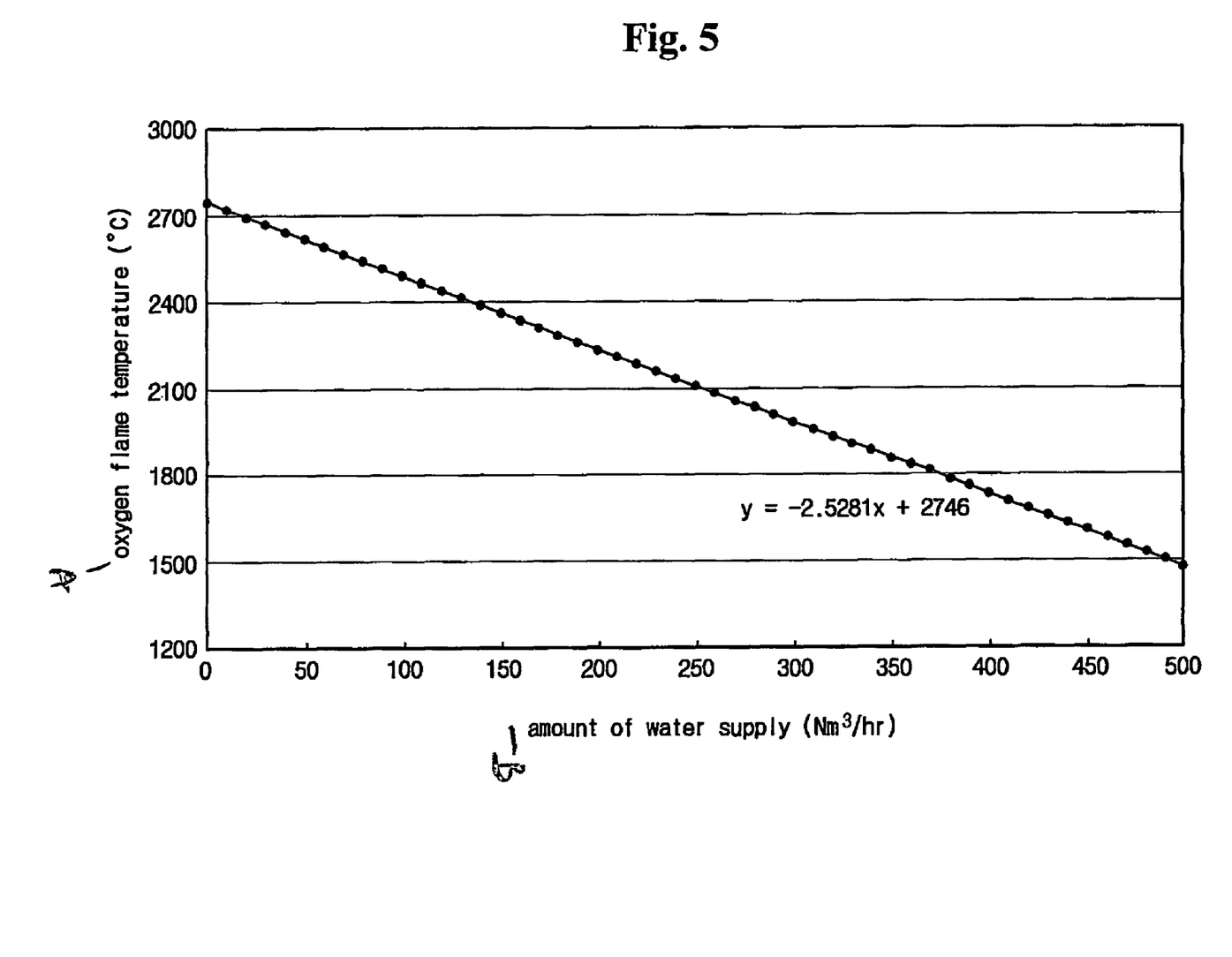
FIG. 5 is a graph showing changes in an oxygen flame temperature as a function of water supply amount according to an experimental example of the present invention.

The test results are shown in FIG. 5. FIG. 5 is a graph showing changes in an oxygen flame temperature as a function of water supply amount according to the experimental example of the invention. In the experimental example of the invention, an atmospheric temperature is set at 600° C. or greater such that an oxygen flame is generated, but since this is a test with respect to an oxygen flame in atmosphere, there may be a difference in the absolute temperature value. However, the reduction in temperature may be predicted as shown in the graph of FIG. 5.

As shown in FIG. 5, in the case where water is supplied to inside the oxygen flame at a rate of approximately 300 Nm$^3$/hr, the temperature of oxygen flame was reduced from about 2700° C. to about 2000° C. The amount of oxygen and the amount of hydrogen generated in this case were each approximately 300 Nm$^3$/hr. Also, in the case where water is supplied to inside the oxygen flame at a rate of approximately 500

Nm³/hr, the oxygen flame was reduced from about 2700° C. to about 1500° C. The amount of oxygen and the amount of hydrogen generated in this case were each approximately 500 Nm³/hr.

In analyzing the relation between oxygen flame temperature to the water supply amount in this Experimental Example, it is clear that for every 1 Nm³/hr of water that is supplied, the temperature of the oxygen flame is reduced by approximately 2.53° C.

Since in the invention oxygen is directly supplied to an area where reduced gas flows to fluidized beds, not only is the negative impact given to the dispersing plate minimized, but the rate of reduction of the iron containing mixture is increased by increasing the temperature of the reduction gas. Therefore, the quality of reduced gas passing through the fluidized beds may be improved and cohesion of the iron containing powder may be prevented.

Also, water is supplied separately from the oxygen supply combustion such that the temperature of reduced gas is reduced. Hence, damage to contents opposite the area where oxygen is supplied is prevented and the reduction ability of the reducing gas is enhanced.

With respect to the water supply nozzle of the invention, since there is used process water or steam that enables the process in the manufacture of molten iron to be easily realized, these processes may be more efficiently performed.

Further, in the invention, in addition to performing the direct supply of and combustion of oxygen in the fluidized beds, a separate oxygen supply apparatus is provided outside the fluidized beds such that the load with respect to oxygen supply may be lessened.

Although embodiments of the invention have been described in detail hereinabove in connection with certain exemplary embodiments, it should be understood that the invention is not limited to the disclosed exemplary embodiments, but, on the contrary is intended to cover various modifications and/or equivalent arrangements included within the spirit and scope of the present invention, as defined in the appended claims.

What is claimed is:

1. A method for manufacturing molten iron, comprising:
   producing an iron-containing mixture by drying and mixing particles of iron-containing ores and additives;
   passing the iron-containing mixture through first to third successively-connected fluidized beds in the presence of reducing gas so that the mixture is reduced and calcined and thereby converted into a reduced material;
   forming a coal packed bed, which is a heat source in which the reduced material has been melted;
   charging the reduced material to the coal packed bed and supplying oxygen to the coal packed bed to manufacture iron; and
   supplying reduced gas exhausted from the coal packed bed to the fluidized bed,
   wherein converting the mixture into the reduced material comprises:
   (a) supplying the reducing gas to the third fluidized bed;
   (b) supplying reducing gas which passed through the third fluidized bed to the second fluidized bed;
   (c) supplying reducing gas which passed through the second fluidized bed to the first fluidized bed;
   (d) preheating the mixture in the first fluidized bed;
   (e) pre-reducing the preheated mixture in the second fluidized bed; and,
   (f) finally reducing the pre-reduced mixture in the third fluidized bed and converting the mixture into the reduced material;
   wherein each fluidized bed comprises a dispersing plate; and,
   wherein a stream of the reducing gas is heated by injected oxygen gas and is partially combusted in (a) to (c), and oxygen gas is directly injected to the reducing gas that passes through a dispersing plate to be partially combusted in (d) to (f).

2. The method of claim 1, wherein in converting the iron-containing mixture to a reduced material, water is supplied separately from oxygen supply combustion process and is mixed with the oxygen.

3. The method of claim 2, wherein the water is one of process water and steam.

4. The method of claim 2, wherein the water is supplied at a rate of 300~500 Nm³/hr.

5. The method of claim 1, wherein the oxygen is supplied and combusted in the case where an internal temperature of a fluidized-bed is 650 degrees Centigrade or higher.

* * * * *